Figure 1:
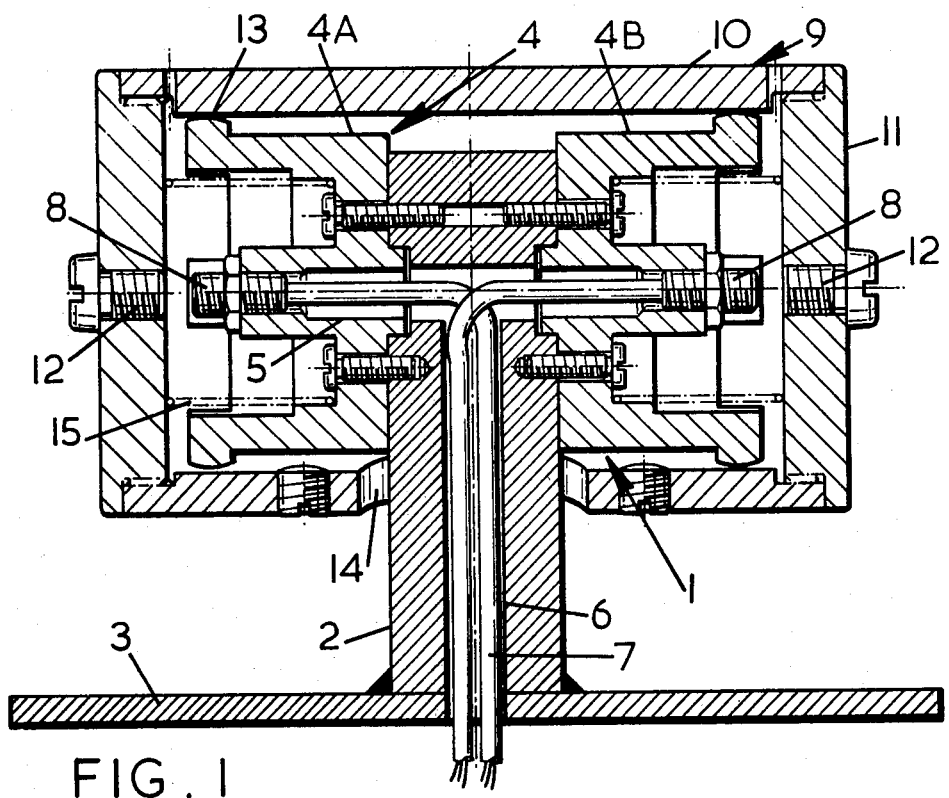

United States Patent [19]

Fairlie-Clarke

[11] 4,295,134

[45] Oct. 13, 1981

[54] LIQUID FLOW DETECTING DEVICE

[75] Inventor: Anthony C. Fairlie-Clarke, Edinburgh, Scotland

[73] Assignee: Vickers Limited, London, England

[21] Appl. No.: 56,649

[22] Filed: Jul. 11, 1979

[30] Foreign Application Priority Data

Jul. 12, 1978 [GB] United Kingdom ............... 29638/78

[51] Int. Cl.³ ...................... G08B 21/00; G01F 15/06
[52] U.S. Cl. .................... 340/610; 340/606; 116/264; 116/275; 200/81.9 R; 73/188
[58] Field of Search ............... 340/610, 606, 603, 592, 340/593, 665, 686; 73/188, 189, 227, 861, 861.21, 861.24, 861.73, 861.74, 861.71, 861.85-861.87; 116/264, 273, 274, 275; 200/81.9 R, 81.9 M, 82 R; 307/116, 118, 119

[56] References Cited

U.S. PATENT DOCUMENTS

| | | | |
|---|---|---|---|
| 2,580,928 | 1/1952 | Kehm ................................. | 116/275 |
| 3,057,977 | 10/1962 | Caswell ............................... | 340/610 |
| 3,559,197 | 1/1971 | Jarvis et al. ......................... | 340/610 |
| 3,745,967 | 7/1973 | Smith et al. ......................... | 116/275 |
| 4,101,874 | 7/1978 | Denison et al. ..................... | 116/274 |
| 4,191,951 | 3/1980 | Fuzzell ................................ | 340/610 |

Primary Examiner—John W. Caldwell, Sr.
Assistant Examiner—Donnie Lee Crosland
Attorney, Agent, or Firm—Larson and Taylor

[57] ABSTRACT

A liquid flow detecting device incorporates a static member arranged to be fixed within a passage through which flow of an operating liquid is to take place and an active member held captive by the static member but free to move relatively to the static member to a limited extent in one particular direction at least. The active member has an overall specific gravity substantially the same as that of the chosen operating liquid. Proximity sensing apparatus is included to detect movement of the active member relative to the static member in the particular direction and to issue a corresponding signal.

10 Claims, 3 Drawing Figures

LIQUID FLOW DETECTING DEVICE

The subject of this invention is a liquid flow detecting device particularly a device for detecting conditions of flow reversal. Such a condition arises, for example, in a tank stabilizing apparatus for a ship employing spaced interconnected wing tanks in which for maximum efficiency of operation it is essential to know when the flow is about to reverse in direction from one wing tank to the other so that the appropriate valve operations may take place at the correct time.

Flow detecting devices are already known. These known devices usually incorporate rotatable vanes. Such known devices suffer from several disadvantages particularly where they are applied to ship stabilizing apparatus. In a ship's stabilizing apparatus the flow of liquid takes place at high velocity during maximum flow conditions and often the liquid itself is contaminated. The known type of detecting device incorporating a rotatable vane to provide a fast response requires to be so light that it is usually unable to resist the high loading imposed on it. Also, as the bearings on which the vane is rotatable are immersed in the liquid they are exposed to corrosion effects and wear which impair the reliability and the accuracy of the device.

It is an object of the present invention to provide a flow detecting device which is robust, contains no bearings and may be made of material which is non-corrodible.

A liquid flow detecting device according to the invention incorporates a static member arranged to be fixed within a passage through which flow of an operating liquid is to take place and an active member held captive by the static member but free to move relatively to the static member to a limited extent in one particular direction at least and having an overall specific gravity substantially the same as that of the operating liquid and proximity sensing apparatus operative to detect movement of the active member relative to the static member in the particular direction and issue a corresponding signal.

In one construction the static member comprises a part of generally cylindrical shape supported crosswise on a post attachable to a fixed support and the active member comprises a hollow cylindrical shell enclosing the inner static member and being a loose sliding fit thereon, the post projecting through an aperture in the side wall of the hollow cylindrical member and the proximity sensing apparatus incorporating at least one pair of co-operating elements one of which is attached to the inner static member and the other of which is attached to the outer active element. One element of the pair may be attached to one end of the static member, the other element being attached to the adjacent end of the active member. Alternatively the proximity sensing apparatus may incorporate two independent pairs of elements located at opposite ends of the active and passive elements. In a further alternative the two pairs of elements may be constituted by three elements one of which is common to the two pairs, two of the elements being mounted side by side on the active or the passive member and the other common element being mounted on the passive or the active member and located to be between the other two elements in the mid-position of the active member.

The outer active cylindrical member may be of a material having a specific gravity differing from the specific gravity of the chosen operating liquid, weighting means or hollow chambers within the active member being provided to bring the overall specific gravity of the active member to substantially the same value as that of the chosen liquid.

Means may be provided for urging the active member to move to a central position with regard to the passive member. Such means may be springs fitted between the ends of the outer active member and the ends of the inner static member.

Conveniently the inner static member may be formed of two cylindrical portions attached to the post concentrically on opposite sides of the post so that the upper end of the post becomes in effect a part of the static member.

The static member and the post may be formed with passages for electrical conductors leading from the proximity sensing apparatus for connection to an external receiver.

A flexible tubular casing may be fitted around the post, the casing being sealable at one end to the fixed support and sealed at the other end to the active member to surround and enclose the aperture in the side wall of the active member through which post passes. The interior of the active member is then sealed off from the exterior so that contaminating substances cannot enter the interior of the active member where they might become lodged in the small clearance passages and interfere with the operation of the apparatus.

The casing may be arranged to function as a light spring resisting any force tending to bend it so that it functions as a centralizing agency on the outer active member and renders unnecessary any centralizing springs. In this connection the casing may be constituted by a corrugated tube of rubber-like material or may be constituted by a metallic bellows.

The proximity sensing apparatus may be connected to logic apparatus which has been programmed or arranged to provide the required indication of flow conditions. For certain conditions the logic apparatus may indicate values of flow or where merely a reversal of flow is to be detected the logic apparatus may be arranged to indicate only that a reversal of direction of flow has taken place, i.e. to indicate a change in the axial position of the active member with respect to the static member and the direction of the change of position. Since there is not a one to one correspondence timewise between change of direction of the liquid flow and change of position of the active member the logic apparatus may be arranged to not the signs that a change is imminent and estimate the real time of the change.

One element of the proximity sensing apparatus may be an armature of magnetizable material having a magnetic permeability greater than unity and may normally be magnetized or unmagnetized and the other element of the proximity sensing apparatus may be a coil with or without a core. Preferably the unwound armature is carried by the active element.

Figure 2:
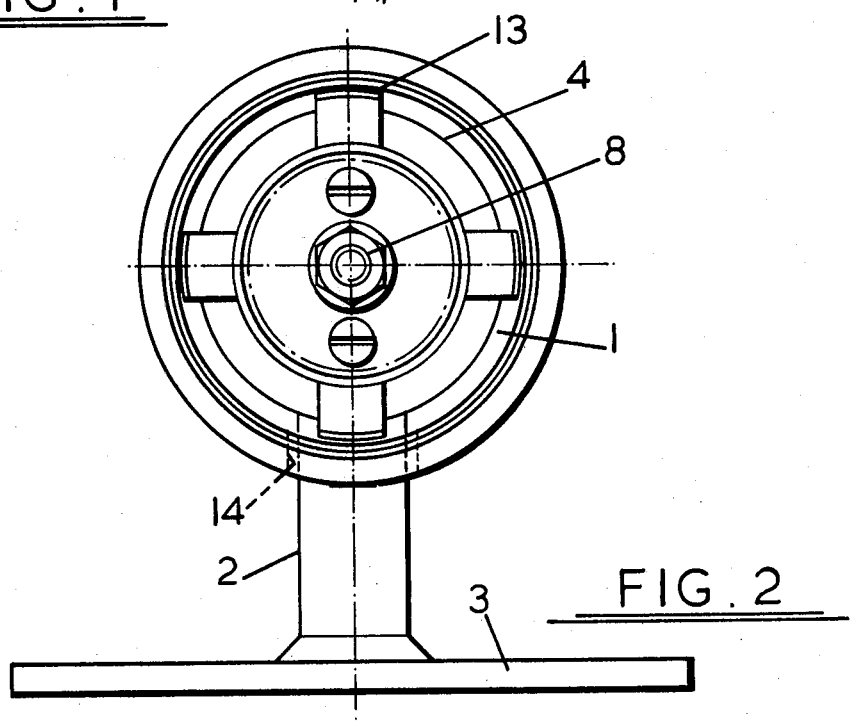
Figure 3:
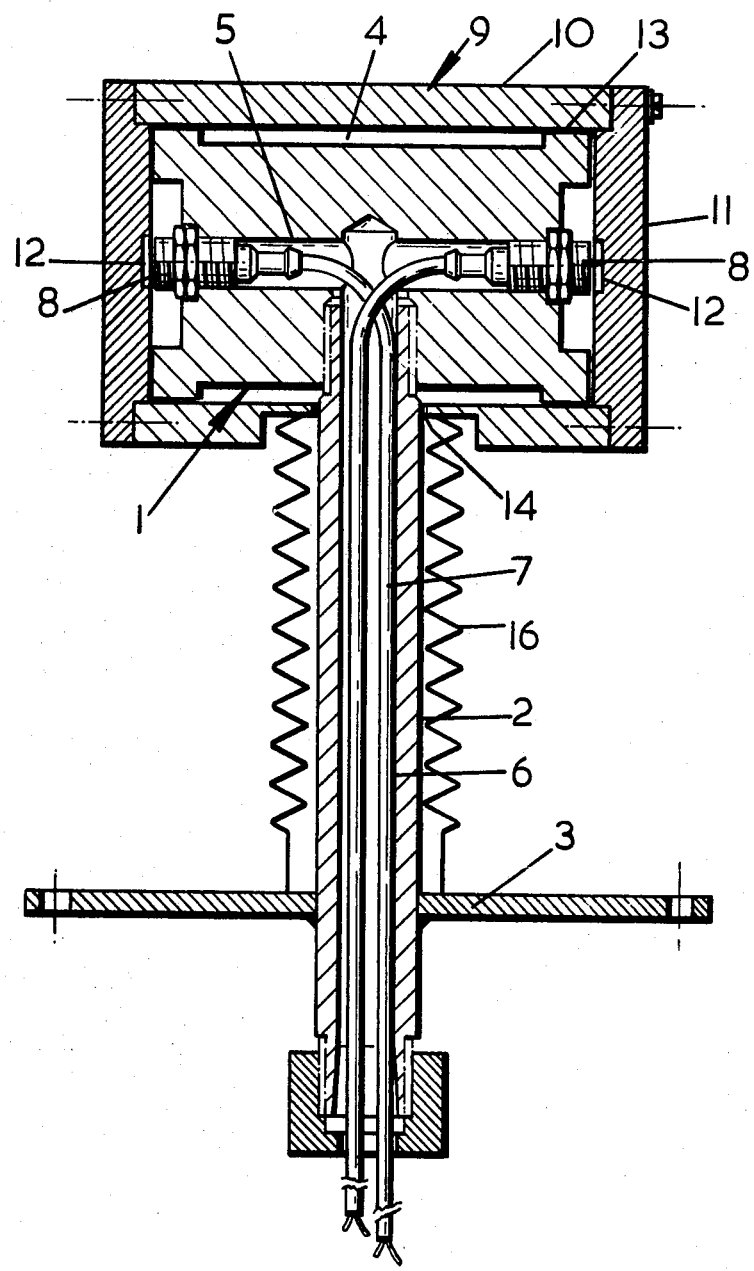

Practical embodiments of the invention are illustrated in the accompanying drawings in which FIG. 1 is a longitudinal section through a device of one form of construction, FIG. 2 is an end view of the device of FIG. 1 with one end of the active member removed to show more clearly the interior and FIG. 3 is a longitudinal section through a device of another form of construction.

In the drawings and referring first to FIGS. 1 and 2, 1 denotes generally a static member comprising a post 2 attached to a support 3 which may be a base plate arranged to be attached within a channel through which the flow of an operating liquid is to take place and in which such flow is to be detected or may be a part of the channel itself and 4 denotes a cylindrical member attached crosswise to the post 2. In the construction of FIGS. 1 and 2 the cylindrical member 4 is formed of two cylindrical portions 4A and 4B attached concentrically to the post 2 on opposite sides of the post so that the upper end of the post becomes in effect a part of the passive member. Passages 5 and 6 are provided through the cylindrical member 4 and through the post 2 respectively for passage of electric conductors 7 connecting elements 8 of separate proximity sensing devices mounted on opposite ends of the cylindrical member 4 and constituting proximity sensing apparatus. 9 denotes an active member enclosing the static member, the active member 9 being formed of an outer cylindrical shell 10 fitted with end plates 11 which support the other elements 12 of the proximity sensing apparatus. The proximity sensing apparatus may incorporate provision for varying the effective area of at least one element whereby to provide an adjustment of the sensitivity of the apparatus. The static member 1 presents pads 13 which are a clearance fit within the shell 10 of the active member 9 while adequate clearance between the ends of the static member 1 and the active member 9 is left so that sufficient axial movement of the active member 9 relative to the static member 1 is provided to allow the proximity sensing apparatus 8, 12 to operate to provide an adequate signal. The shell 10 is formed with an opening 14 for passage of the post 2 and the outer active member 9 is held captive by the inner static member 1 while being free to move relatively to the static member 4 in an axial direction. The liquid with which the device is to be used has free access to the interior of the active member. 15 denotes centralizing springs provided to centralize the active member 9 on the static member 1. The active member 9 is arranged to have an overall specific gravity substantially the same as the specific gravity of the liquid with which the flow detecting device is to be used. For example where the device is to be used to detect changes in the direction of flow of a stream of water having a specific gravity which is substantially unity the outer active member 9 may be made of a plastics material selected from a range of plastics materials now available and having a specific gravity just slightly less than unity it being then possible to adjust the overall specific gravity of the outer active member 9 by employing weights attached to the active member, for example the sensing device elements 12 may be arranged to be sufficiently heavy to raise the overall specific gravity of the active element substantially to that of water. The same expedient may be used where the device is to be used with a liquid the specific gravity of which is different from that of water. The electrical conductors 7 are led to apparatus which may be logic apparatus. Alternatively the active member may be formed of a material having a specific gravity higher than that of the liquid in which it is to be immersed, cavities being formed in the member to reduce the overall gravity to that desired.

In FIG. 3 components of the device illustrated which have counterparts in the construction of FIGS. 1 and 2 are denoted by the same reference numerals. In the apparatus illustrated in FIG. 3 the post 2 is encased in a flexible tubular casing 16 which is sealed at one end to the support 3 and at the other end to the shell 10 of the active member 9 to surround and enclose the opening 14. The interior of the active member 9 is thus isolated completely from the exterior. The casing 16 is formed to act as a spring and tends always to move to a central position in which its axis is straight thus tending to move the active member to a centralized position with respect to the static member 1. Centralizing springs are unnecessary in this construction. In the construction of FIG. 3 the post 2 does not form any significant part of the static member 1 but screws into it sufficiently to support it rigidly.

In practice, movement of a liquid in which the device is immersed in the axial direction of the device will cause the outer active element 9 to try to move along with the flow and according to the direction of movement the elements 8, 12 of one pair of proximity sensing devices move closer together while those of the other pair recede from one another, the changes in the gaps between the elements of the pairs being noted by logic apparatus not shown. When the direction of flow changes the outer active member 9 then moves relatively to the inner static member 1 in the opposite direction and the relative positions of the two pairs of proximity sensing elements are reversed, the emitted signal again being noted by the logic apparatus as a reversal signal.

It has been remarked previously that there will be a slight delay when a change of flow takes place before the device indicates the change of flow. Compensation for this can be made in two different ways. One way of providing this compensation is as follows. When the liquid has been flowing in one direction and the device has indicated flow in that direction the active member 9 is displaced relatively to the static member 1 in the downstream direction. As flow movement approaches zero the centralizing effort exerted on the active member by the springs 15 or by the casing 16 begins to overcome the effort exerted on the active member 9 by the liquid thus causing the member 9 to move counter to the direction of liquid movement. The proximity sensing apparatus will indicate this counter movement to the logic apparatus and the logic apparatus can be programmed to take this as an indication that flow is about to come to rest and reverse and to issue a reverse signal at the real point of reversal. In the other way of providing the compensation the proximity sensing apparatus 8, 12 is so arranged that when the active member 9 is in either of its extreme positions the two proximity sensing elements at the downstream end of the device are too far apart to have any influence on one another. When reversal is about to take place as described above the outer member 9 is moved by the springs 15 or by the spring effect of the casing 16 towards its mid-position. At the point when reversal takes place and the liquid is at rest the outer member 9 will have reached almost its mid-position but because of friction between the outer member 9 and the inner member 1 the outer member will not be exactly central when flow is zero. The proximity sensing apparatus can be arranged to indicate this situation, the logic apparatus being programmed to indicate this as the point of change of flow.

The device of the invention shows extreme sensitivity. This is because of the feature of the outer member having substantially the same overall specific gravity as the liquid in which it is immersed. If in a volume of liquid a quantity of that liquid could be isolated from the rest of the liquid by a weightless flexible barrier the enclosed liquid although separate from the rest of the liquid would behave almost exactly as if it were still forming a part of the surrounding liquid. There would certainly be present extremely minute variations caused by changes of viscosity occurring across the barrier and compression on the enclosed liquid but these would be so small as to be either undetectable or negligible. If the body of liquid enclosed by the barrier were replaced by a solid object having the same specific gravity as the liquid of which it takes the place this solid object would also behave as if it were liquid forming part of the entire body of liquid, once again with minor discrepancies resulting chiefly from viscosity considerations which would arise when the liquid was in motion but at low rates of motion these would be negligible. The device of the invention operates on this principle. Since the outer active member 9 has substantially the same specific gravity as the liquid in which it is immersed, at low velocities of flow it behaves substantially as if it formed part of the liquid. It thus moves for all practical purposes exactly in conformity with the movement of the liquid itself. It was remarked above that viscosity considerations are negligible at low rates of flow. Where the device is intended to indicate nothing more than reversals of flow which is all it normally requires to do in ship's stabilizing apparatus it requires to be operative only with rates of liquid flow which are extremely low because at the point of liquid reversal the liquid is on the point of coming to rest before changing its direction and the rate of flow of the liquid is very small both immediately before and immediately after reversal.

The device is capable of giving long service without attention because it can be constructed almost completely or even completely of non-corrodible materials, it contains no moving parts apart from the relatively movable static and active members, the proximity sensing elements can be embedded in the material forming the static and active members so that they are free from contamination by any foreign matter in the liquid and friction between the outer active member 9 and the inner static member 1 can be reduced to a negligible figure by forming the pads 13 of such a material as polytetrafluoroethylene. In the construction employing a casing isolating the interior of the active member from the liquid surrounding the exterior and the interior of the active member is filled with the same liquid as that in which the device is immersed the active member continues to operate as if it were part of the liquid as described above but no foreign matter in the liquid external to the active member can gain access to the interior of the active member and thus there will never be any troubles arising for example from particles of foreign matter obtaining access to the narrow liquid passages within the active member.

What is claimed is:

1. A liquid flow detecting device incorporating a static member arranged to be fixed within a passage through which flow of an operating liquid is to take place and an active member held captive in space by the static member but physically separate from the static member and free to undergo a displacement relatively to the static member to a limited extent in one particular direction at least and having an overall specific gravity substantially the same as that of the chosen operating liquid and proximity sensing apparatus operative to detect movement of the active member relative to the static member in the particular direction and issue a corresponding signal.

2. A device as claimed in claim 1 in which the static member comprises a part of generally cylindrical shape and a post attachable to a fixed support to which the static member is attached in a crosswise position, the active member comprises a hollow cylindrical shell enclosing the inner static member and being a loose sliding fit therein, the post projecting through an aperture in the side wall of the hollow cylindrical member and the proximity sensing apparatus incorporates at least one pair of co-operating elements one of which is attached to the inner static member and the other of which is attached to the outer active member.

3. A device as claimed in claim 2 in which one element of the pair is attached to one end of the static member and the other element is attached to the adjacent end of the active member.

4. A device as claimed in claim 2 in which the proximity sensing apparatus incorporates two independent pairs of elements located at opposite ends of the active and passive elements.

5. A device as claimed in claim 2 in which the inner static member is formed of two cylindrical portions attached to the post concentrically on opposite sides of the post so that the upper end of the post becomes in effect a part of the static member.

6. A device as claimed in claim 2 in which a flexible tubular casing surrounds the post and is arranged to be sealed at one end to the support and is sealed at the other end to the active member to surround and enclose the aperture in the side wall of the hollow cylindrical shell of the active member.

7. A device as claimed in claim 6 in which the casing is constituted by a corrugated tube of rubber-like material.

8. A device as claimed in claim 6 in which the casing is constituted by a metallic bellows.

9. A device as claimed in claim 6 in which the casing is formed to tend to revert to a particular undeflected configuration when deflected from that configuration.

10. A device as claimed in claim 2 in which the static member and the post are formed with passages for electrical conductors leading from the proximity sensing apparatus for connection to an external receiver.

* * * * *